UNITED STATES PATENT OFFICE.

JAMES B. WHERRY, OF DES MOINES, IOWA, ASSIGNOR TO THE REFINITE COMPANY, A CORPORATION OF DELAWARE.

METHOD OF MANUFACTURING WATER-SOFTENING MATERIAL.

1,388,133.  Specification of Letters Patent.  Patented Aug. 16, 1921.

No Drawing.  Application filed May 29, 1917.  Serial No. 171,782.

*To all whom it may concern:*

Be it known that I, JAMES B. WHERRY, a citizen of the United States, residing at Des Moines, in the county of Polk and State of Iowa, have invented certain new and useful Improvements in Methods of Manufacturing Water-Softening Material, of which the following is a specification.

This invention relates to a method of manufacturing a water softening material, by combining a natural clay, having base exchange properties with the sodium of sodium chlorid and sodium hydroxid.

It has heretofore been proposed to treat materials occuring in nature as clays and having for their base a hydrated silicate of aluminum by baking such material to render it hard enough to prevent disintegration under the action of water thereby rendering it useful as a water softener.

It has also heretofore been proposed to regenerate such material by subjecting it to the action of sodium chlorid. Such regeneration may be an initial regeneration, that is, a treatment of the material with salt after it is taken from the earth and before it is used to soften water, or it may be a regeneration after the material has been used to soften water and has taken up the calcium and magnesium salts from the water. In either case the action of the salt is to remove the calcium and magnesium salts from the material leaving it ready again to take up such salts from water passed through a bed of the material, it being understood that it is the presence of these calcium and magnesium salts in the water that renders the water hard.

In carrying out the invention I take a natural clay containing a large proportion of hydrated silicate of aluminum, in combination with sodium or potassium or their exchange equivalent of calcium and magnesium and possessing such characteristics that it is capable of softening water by base exchange.

I first reduce this material to a pasty mass by any suitable means, then treat the material in this condition with a strong solution of sodium chlorid. The sodium of the sodium chlorid replaces the greater part of the calcium and magnesium, which the hydrated double silicate has taken up from ground waters, and renders the mass essentially a hydrated double silicate of aluminum and sodium. I then wash out the dissolved chlorids of calcium and magnesium which have been released from the material by the action of sodium chlorid together with the excess sodium chlorid. I then subject the mass to the action of sodium hydroxid in excess, which accomplishes a four-fold purpose.

(1.) Dissolves out impurities, which are present in varying amounts owing to the nature of the deposit, such impurities as amorphous silica ($SiO_2$), sodium silicate and in rare cases amorphous alumina.

(2.) Converts any acid double silicates which have been formed by the action of ground acids into sodium double silicates thus increasing the capacity of the product.

(3.) Treatment greatly facilitates handling of the mass in that the product resulting is essentially a double silicate of aluminum containing sodium and is quite pure.

(4.) Upon roasting, the excess sodium hydroxid is rendered very reactive, while that part of the clay which is merely a hydrated silicate of aluminum, and is not a sodium salt of aluminum silicate is completely dehydrated, forming a compound similar to an oxid, which upon cooling is found to have united with the sodium hydroxid forming a sodium salt of aluminum silicate.

I then divide the mass into particles of a desired size and then dry it slowly at atmospheric temperature for approximately forty-eight hours, then dry it more rapidly at from one hundred to two hundred degrees centigrade for another twenty four hours, then if necessary, reduce it to still smaller particles; then bake it in a furnace at or about seven hundred degrees centigrade until it is hard enough to resist disintegration by water. It is next dumped into a vat containing a solution of an alkali metal, where I leave it until the rehydration is complete; time of rehydration is lessened if solution is kept hot, but this is unnecessary.

The material is then washed with water to free it from any excess sodium hydroxid which may not have combined with the material, and from the excess of alkali metal of the rehydrating bath.

Furthermore it is to be understood that the two separate steps of drying are not absolutely necessary though they are desirable. The steps of drying at atmospheric temperature prevents the material from cracking by uneven shrinkage, while the step of drying at a higher temperature, i. e., above one hundred degrees centigrade serves to remove the free moisture. When the material is subjected to the action of sodium hydroxid as above set forth, upon roasting, said sodium hydroxid chemically combines with some of the silicate taking the place of the chemically combined water removed by roasting.

Increased capacity is a marked property of the product manufactured by the above described method. The sodium of the sodium hydroxid becomes part of the silicate or softening material and becomes replaceable by the calcium and magnesium of the calcium and magnesium salts in the water to be treated. As before stated, the calcium and magnesium may be removed from the softening material by the action of the sodium chlorid thus leaving the material in its original condition.

Having described my invention what I claim is:—

1. The herein described process of producing a water softening material which includes the step of subjecting a natural clay substance having base exchange properties to a temperature sufficiently high to completely dehydrate the material without fusion thereof, and subsequently rehydrating the dehydrated material with an aqueous solution containing an alkali metal.

2. The herein described process of producing a water softening material which consists in preliminarily treating a natural clay having base exchange properties with a solution of sodium chlorid, subsequently subjecting the material to the action of sodium hydroxid, baking the material at a temperature sufficient to completely dehydrate the same, and finally rehydrating the material with an aqueous solution containing an alkali metal.

In testimony whereof I affix my signature.

JAMES B. WHERRY.